US010013439B2

(12) United States Patent
Gruenheid et al.

(10) Patent No.: US 10,013,439 B2
(45) Date of Patent: Jul. 3, 2018

(54) AUTOMATIC GENERATION OF INSTANTIATION RULES TO DETERMINE QUALITY OF DATA MIGRATION

(75) Inventors: Anja Gruenheid, Wiesbaden (DE); Albert Maier, Tuebingen (DE); Martin Oberhofer, Bondorf (DE); Thomas Schwarz, Stuttgart (DE); Manfred Vodegel, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 13/169,211

(22) Filed: Jun. 27, 2011

(65) Prior Publication Data
US 2012/0330911 A1  Dec. 27, 2012

(51) Int. Cl.
*G06F 17/00* (2006.01)
*G06F 17/30* (2006.01)

(52) U.S. Cl.
CPC ...... *G06F 17/30303* (2013.01); *G06F 17/303* (2013.01)

(58) Field of Classification Search
CPC .............. G06F 17/30303; G06F 17/303
USPC ...................... 707/602, 999.1, 694
See application file for complete search history.

(56) References Cited

U.S. PATENT DOCUMENTS

| 7,509,327 | B2 | 3/2009 | Joshi et al. | |
|---|---|---|---|---|
| 7,711,660 | B1 * | 5/2010 | Gentile | G06Q 50/22 705/2 |
| 2003/0028399 | A1 * | 2/2003 | Davis | G06F 19/3418 705/2 |
| 2005/0108631 | A1 * | 5/2005 | Amorin et al. | 715/513 |
| 2007/0055688 | A1 | 3/2007 | Blattner et al. | |
| 2008/0071844 | A1 | 3/2008 | Gopal et al. | |
| 2008/0215621 | A1 * | 9/2008 | Ravindran | G06Q 10/10 707/999.107 |
| 2009/0043778 | A1 | 2/2009 | Jambunathan et al. | |
| 2009/0164177 | A1 * | 6/2009 | Hamazoe | G06F 17/50 703/1 |
| 2009/0222470 | A1 * | 9/2009 | Kemp | G06F 17/30592 707/E17.005 |
| 2009/0282089 | A1 * | 11/2009 | Lakshmanachar et al. | 707/204 |
| 2009/0327452 | A1 * | 12/2009 | Rand | G06Q 30/06 709/219 |
| 2010/0185637 | A1 | 7/2010 | Morris et al. | |
| 2010/0280990 | A1 | 11/2010 | Castellanos et al. | |

* cited by examiner

*Primary Examiner* — Phong H Nguyen (74) *Attorney, Agent, or Firm* — Susan Murray; SVL IPLaw (57) ABSTRACT

During migration of data from at least one data source to a target system, data quality is determined by obtaining metadata associated with the target system, automatically generating instantiated rules for assessing a quality of data to be loaded from the at least one data source into the target system, where the instantiated rules are dependent upon the obtained metadata associated with the target system, and applying a quality analysis based upon the instantiated rules to the data to be loaded into the target system. The quality analysis provides an indication of a level of compliance of the data with requirements of the target system.

17 Claims, 3 Drawing Sheets

GAP REPORT

SCHEMA NAME:  
ALG0

OBJECT NAME:  
CUSTOMER

NUMBER OF GAPS PER GAP TYPE

PERCENTAGE OF GAPS PER TABLE AND GAP TYPE

FIG.3

AUTOMATIC GENERATION OF INSTANTIATION RULES TO DETERMINE QUALITY OF DATA MIGRATION

BACKGROUND

1. Technical Field

Embodiments of the invention relate to enterprise data integration, and in particular to providing data quality in data migration (e.g., ETL) processes.

2. Discussion of the Related Art

When initially loading data into a target system via an extract, transform and load (ETL) process, such as loading data into a data warehouse or loading data for some other data processing project, there can be multiple different data sources from which data is extracted. The data from different sources is typically extracted into a migration database, where operations such as data harmonization and data cleansing can be performed. The data is then loaded from the migration database into the target system.

Data quality issues often arise during ETL processing of data from a data load perspective into a target system for a number of different reasons (e.g., a mandatory field is empty, data values are not within a permissible range, lookup values are incorrect, certain constraints may be violated, etc.). When a particular field in a record does not comply with target system requirements, this represents a gap in the data quality and the record is rejected during load. Today, these data quality checks are done manually or by manually implemented rules (assuming a data quality check is done at all). Even if a data quality check is performed, this is not done systematically due to the manual approach and since the target system configuration changes during implementation, these changes are not reflected right away. As a result data migration projects often exceed initial processing time and budget estimates, because these data quality issues are only detected during load tests which are usually conducted shortly before the go-live date.

BRIEF SUMMARY

In an example embodiment of the present invention, a computer-implemented method of determining data quality during migration of data from at least one data source to a target system comprises obtaining metadata associated with the target system, automatically generating instantiated rules for assessing the data quality of data to be loaded from the at least one data source into the target system, wherein the instantiated rules are dependent upon the obtained metadata associated with the target system, and applying a quality analysis based upon the instantiated rules to the data to be loaded into the target system, wherein the data quality analysis provides an indication of a level of compliance of the data with requirements of the target system.

In another example embodiment of the present invention, a system is provided for assessing the quality of data obtained from at least one data source and stored within a migration database for loading into a target system. The system comprises an analytics generator configured with logic to obtain metadata associated with the target system and automatically generate instantiated rules for assessing data quality of data stored within the migration database, wherein the instantiated rules are dependent upon the obtained metadata associated with the target system. The system further comprises an executor configured with logic to apply a quality analysis based upon the instantiated rules to the data within the migration database, wherein the quality analysis provides an indication of a level of compliance of the data with requirements of the target system.

In still another example embodiment of the present invention, a computer program product is provided for determining data quality during migration of data from at least one data source to a target system. The computer program product comprises a computer readable storage medium having computer readable program code embodied therewith, the computer readable program code configured to obtain metadata associated with the target system, automatically generate instantiated rules for assessing a quality of data to be loaded from the at least one data source into the target system, wherein the instantiated rules are dependent upon the obtained metadata associated with the target system, and apply a quality analysis based upon the instantiated rules to the data to be loaded into the target system, wherein the quality analysis provides an indication of a level of compliance of the data with requirements of the target system.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Present invention embodiments provide for automatic generation of instantiated or instantiation rules utilizing metadata and rule templates to provide an indication of data quality during migration of data from data sources to a target system. The instantiated rules facilitate the generation of data quality analytics, which provide a measure of readiness or compliance of data to be loaded or used within a target system based upon the target system requirements. Some non-limiting examples of target systems that can be used for migration of data in accordance with invention embodiments include an SAP based enterprise system, an IBM® DB2® based enterprise system, etc. (IBM and DB2 are trademarks of International Business Machines Corporation, registered in many jurisdictions worldwide).

Figure 1:
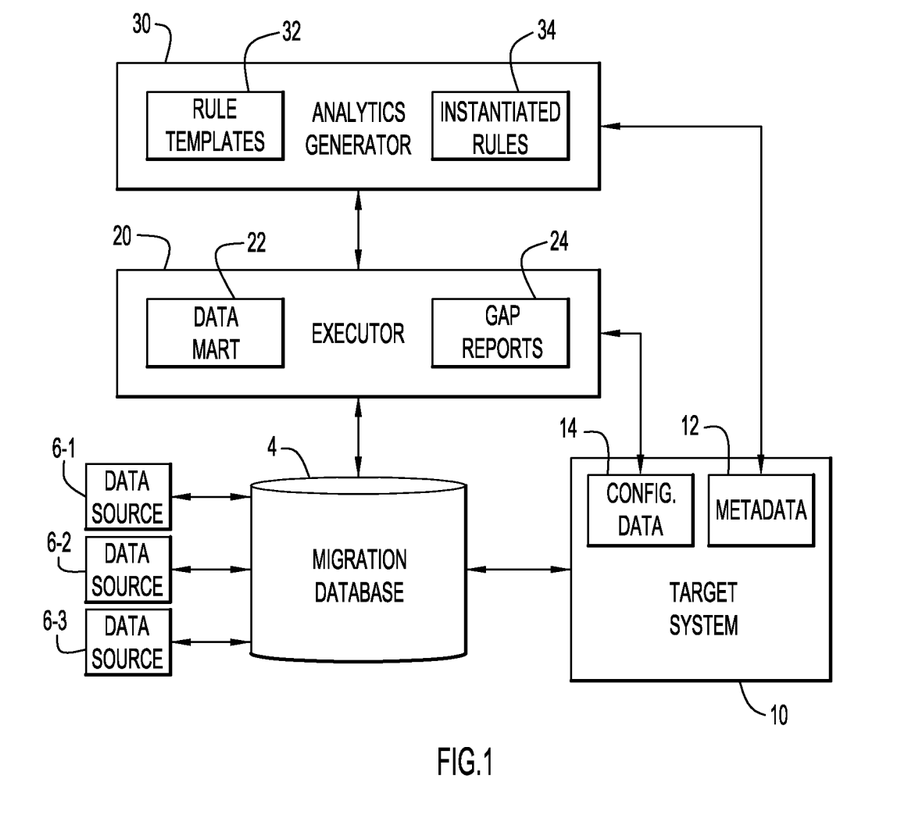
FIG. 1 is a diagrammatic illustration of an example embodiment of a data migration system in accordance with the present invention.

An example embodiment of a system that implements features of the present invention is depicted in FIG. 1. The system includes a migration database 4 to receive data from a plurality of data sources 6-1, 6-2, 6-3. The data sources 6-1, 6-2, 6-3 can be the same or different types of data sources from which data is to be extracted and processed within the migration database 4 utilizing any suitable extract, transfer and load (ETL) process. The extracted data is analyzed in the migration database 4, based upon instantiated rules provided by an analytics generator 30 and executed by an executor 20, to determine the readiness or compliance of the data based upon target system requirements prior to loading into the target system 10. The instantiated rules (provided in an instantiated rules module 34) are generated based upon metadata for the target system and rule templates (provided in a rule templates module 32 of the analytics generator 30). The metadata for many target systems (such as metadata 12 within target system 10) provides information about the data such as which columns and fields a specific table contains, field lengths and field types. Many target systems differentiate metadata from configuration data, which provides information about values that are valid for a specific field for the system. Therefore, the executor 20 obtains configuration data 14 from the target system 10 and utilizes this configuration data in combination with the instantiated rules to generate analytical information about the quality of the data.

As will be appreciated by one having ordinary skill in the art, the analytics generator and executor can be adapted to produce and apply instantiated rules to data residing outside the migration database which might be used for data enrichment purposes during data migration. Examples of such data might be Dun & Bradstreet or similar data from external third party providers or data from other legacy systems. In this scenario, the data would be checked to determine whether it is good enough for enrichment purposes.

In addition, the rules for assessment can be generated before the extract step from the source is triggered. In this case, in an alternative implementation, the executor can apply the instantiated rules also on data in direct transit from source to target with no need for a migration database. In such an implementation, the executor could filter out all the records with gaps for later review and cleansing.

Further, with ETL tools like IBM® InfoSphere® Information Server and database servers like IBM DB2 having full support of XML built-in, the invention embodiments described herein can also be readily adapted and applied on XML and similar semi-structured data. (IBM and InfoSphere are trademarks of International Business Machines Corporation, registered in many jurisdictions worldwide.

The migration database 4, sources 6, target system 10, executor 20 and analytics generator 30 may be remote from each other and communicate (as indicated by the arrows between different systems as shown in FIG. 1) via a direct connection or any suitable network. For example, a network can be implemented to facilitate transfer any types of data and/or other information between two or more systems utilizing any suitable communications media (e.g., wide area network (WAN), local area network (LAN), Internet, Intranet, etc.). Alternatively, one or more of the migration database 4, data sources 6, target system 10, executor 20 and analytics generator 30 may be local to each other, and communicate via any appropriate local communication medium (e.g., local area network (LAN), hardware, wireless link, Intranet, etc.). Further, the any two or more of the analytics generator 30, executor 20, target system 10 and migration database 4 can be implemented as sub-components within a single system.

Each of the migration database 4, data sources 6, target system 10, executor 20 and analytics generator 30 may be implemented by any conventional or other computer systems which can be equipped with a display or monitor to provide a graphical user or other interface (e.g., to provide command line prompts, menu screens, etc.) to solicit information from users pertaining to the desired data and analysis, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis and/or other types of modules, browser/interface software, etc.).

The analytics generator 30 includes a rule templates module 32 comprising a plurality of predefined rule templates. Each rule template is utilized to provide a certain type of Gap Report (stored within a Gap Report module 24) that provides a metric regarding to the quality of certain fields of the data from the migration database 4 to be loaded into the target system 10. For example, if a field in a record of the extracted and processed data within the migration database 4 does not comply with certain target system requirements as identified in a particular rule template, this represents a Gap in the quality of the data. The different rule templates provide metrics based upon different target system requirements, and different Gap Reports can be generated based upon one or a combination of rule templates applied to the processed data within the migration database 4. Some examples of different types of Gap Reports that can be generated include, without limitation, Data Completeness Gap Reports (DCGR), Data Validity Gap Reports (DVGR), Field Length Gap Reports (FLGR), Category Completeness Gap Report (CCGR), Relationship Orphan Gap Report (ROGR), Record Relationship Gap Report (RRGR) and Data Type Gap Report (DTGR).

The DCGR exploits the target system metadata for a table where for each field there is nullability flag indicating whether or not the field is nullable. If this flag is set to non-nullable, this means each record must have a value different from the null value for that field, otherwise the record violates a constraint of the target system and the record will be rejected during the load process. The DCGR measures the number of violations by field of non-nullable fields in the target system metadata. In an example scenario, a table has 1000 records and 3 out of 10 columns of that table are set as non-nullable in the target system metadata. In this scenario, 100 out of these 1000 records violate in 2 out of the 3 non-nullable columns the constraint by not having a value (i.e., they are null). In this scenario, a DCGR would report 100 violating records and a total of 200 individual data completeness gaps and their corresponding fields.

The DVGR measure compliance with values in reference data tables in the target system. In an example scenario, the target system has for customer data a related table for address information. In many target systems, an address table has a field indicating the country which has a foreign-key relationship to a reference data table containing the valid country codes. If an address record coming from the source would have a country code value (e.g., 62 indicating Germany in the source) which is not included in the reference table of the target system (which might have a value of DE for Germany, but not 62), the integrity checks during load processing would reject that record. Execution of a DVGR requires the following steps. For each table and within each table for each field, it must first be discovered from the target system metadata whether the field is supported by a reference data table (typically discoverable by a foreign-key relationship between the data table and the reference data table). If this is true, an extraction job is generated to extract a reference data table into the migration database based on the discovered reference data table according to an example embodiment of the invention. Then, the DVGR can validate against the extracted reference data table for each record from a source system for each field backed by a reference data table in the target system whether or not the value in field checked exists in the reference data table value set. If the value in a field checked does not exist in the reference data table value set, a data validity gap has been identified by the DVGR.

For the FLGR, from the target system the metadata for each field in each table indicating the permissible value length is extracted. The FLGR measures for each field in each table for each source record whether or not the value in the field measured is longer then the maximum length of the field in the target. A violation means that the target system has not enough space to store the value. For example, if a 'STREET' field in the target has a maximum length of 75 characters and a record from the source system would have for the street field a value of 150 characters, then the maximum length of the target system would be exceeded and the FLGR would report this as a gap.

The CCGR is similar to the DCGR in providing a gap report measuring completeness. One difference between CCGR and DCGR is that there are applications (e.g. SAP) where business objects (e.g. customer) have different mandatory field requirements based on the category configuration of a customer. For example, a customer in the category of "one-time customer" might have only four mandatory fields based on the category classification. A customer record in the category "regular enterprise customer" might have 18 mandatory fields. The CCGR measures completeness by considering the metadata configuration by category. In the previous given examples for the one-time customer the CCGR would validate regarding completeness for customer records in the category of one-time customer four fields whereas the CCGR would validate for customer records in the regular enterprise customer category 18 fields.

Business objects in enterprise applications (e.g. SAP) often consist of multiple tables where the tables have parent-child relationships (e.g. customer, material, etc.) in a hierarchical, tree-like table structure. The RRGR is used to detect missing, mandatory child records for a record in a parent table. In SAP, ERP for the customer object it is possible to configure a mandatory contact person for an enterprise customer. The core information of the enterprise customer record is the root node of the table hierarchy tree. The table holding the contact person information is a child table of this root node table. Thus, the RRGR would detect whether or not for each record in the root node there is a record in all child tables which need to have at least one mandatory record. More generally, since the hierarchical, tree-like table structure can have more then two layers, the RRGR checks for any record in a parent table in such a table tree if a record in a mandatory child table exists.

An orphan record in a child table does not have a mandatory record in the parent table. The ROGR is used to detect orphan records in child tables in a business object which has a hierarchical table structure. Detecting orphan records is required, because otherwise the instance of the business object cannot be loaded into the target system. This situation often occurs when a legacy application of a different type then the target application is part of the data migration where the data model of the source might not have a corresponding table for each table in the target.

The DTGR measure compliance of the source data regarding the data type compliance from a target system perspective. More specifically, the schema mapping from the source data model to the target data model (there is one such mapping for each combination of source and target system) defines how fields from the source correlate with fields from the target from a functional point of view. A data type is characterized by its data type (examples include INT (integer), BIGINT (big integer), CHAR (fixed length character), DECIMAL, DATE, TIME, TIMESTAMP, etc.) as well as attributes of the data type such as length (e.g. a CHAR field might be defined with a length of 32 characters as CHAR (32)) or precision (a DECIMAL might have for example 31 digits). The DTGR measures how many of the functional correlations between source and target fields are compatible from a data type perspective. For example, a field declared as CHAR(32) in the source which is mapped to a CHAR (128) field in the target would work from a data type compatibility perspective since the target data type is a superset (length 128>=length 32) of the source data type. However, the DTGR would flag a gap if a field in the source of type BIGINT is mapped to a field of type INT in the target because BIGINT has a larger value range than INT. Note that gaps identified by the DTGR might not be a problem. For example, if data profiling of a column declared BIGINT in the source reveals that all values are within the range of INT, then the data can be migrated to the target. However, if data profiling reveals that there are indeed values in the source exceeding the permissible INT range of the target, the conflict of the data types must be resolved. If such a data type gap must be resolved, this might lead to adjustments in the data model of the target (e.g. changing INT to BIGINT in the target system for the field in question) or conditioning of the data so that all values fit into the permissible range of the target.

As previously noted, DCGR, DVGR, FLGR, CCGR, RRGR, ROGR and DTGR are just seven examples of different types of Gap Reports that can be generated and to which different rule templates can be provided within the system of the example embodiments of the invention. The invention embodiments are not limited to these specific types of Gap Reports, but instead any selected number of different types of rule templates can be provided to generate any suitable number of different types of Gap Reports.

The analytics generator 30 further includes an instantiated rules module 34 that automatically generates instantiation rules based upon the rule templates and also metadata associated with the target system 10. The metadata 12 of the target system 10 provides information describing data structures within the target system 10 (e.g., tables, fields, field lengths, field types, etc.). The metadata 12 can be obtained by the analytics generator 30 by reading it directly from the target system 10 or using any suitable analyzer tools that are capable of profiling metadata from the target system 10. The instantiated rules are generated by replacing placeholders in the rule templates with information obtained from the metadata associated with how data is stored within the target system 10 (e.g., table names, field names, field lengths, reference data tables or lookup tables, etc.).

The executor 20 obtains configuration data 14 associated with the target system 10. The configuration data can be obtained by the executor 20 directly from the target system 10 or, alternatively, indirectly from outside the target system 10. The configuration data 14 describes which values are valid for specific fields within the target system 10. The executor 20 further receives the instantiated rules from the analytics generator 30 and implements these rules in relation to the data extracted from the data sources 6 and located within the migration database 4. In an example embodiment, there may be multiple copies of data in the migration database 4 representing intermediate results from data processing steps that occur during data migration. The executor 20 can run the instantiation rules on any one or more copies of the data within the migration database 4. This results in a determination of which fields violate the instantiation rules for particular templates (e.g., recorded as number of gaps, where a number of X gaps refers to X fields which violate the instantiation rules and/or configuration data for a particular table name and a particular gap type), and the results are stored within a data mart 22 of the executor 20. The results stored within the data mart 22 facilitate the generation of Gap Reports by a Gap Report module 24. The Gap Reports can further be visualized by providing plots or charts organized by Gap Report type.

The migration database 4 can store multiple copies of data to be migrated to the target system 10, where at least some of the copies can represent intermediate results of processing steps associated with the data migration. The tables of data in each copy within the migration database 4 can be structured similarly to the corresponding data structures of the target system 10, which also allows the analytics generator 30 to obtain metadata from the migration database 4 instead of directly from the target system 10. The migration database 4 can also hold technical tables to store metadata and configuration data associated with the target system 10, allowing for access to such data by the analytics generator 30 and executor 20 as needed (e.g., in scenarios in which such data cannot be obtained directly from the target system).

Figure 2:
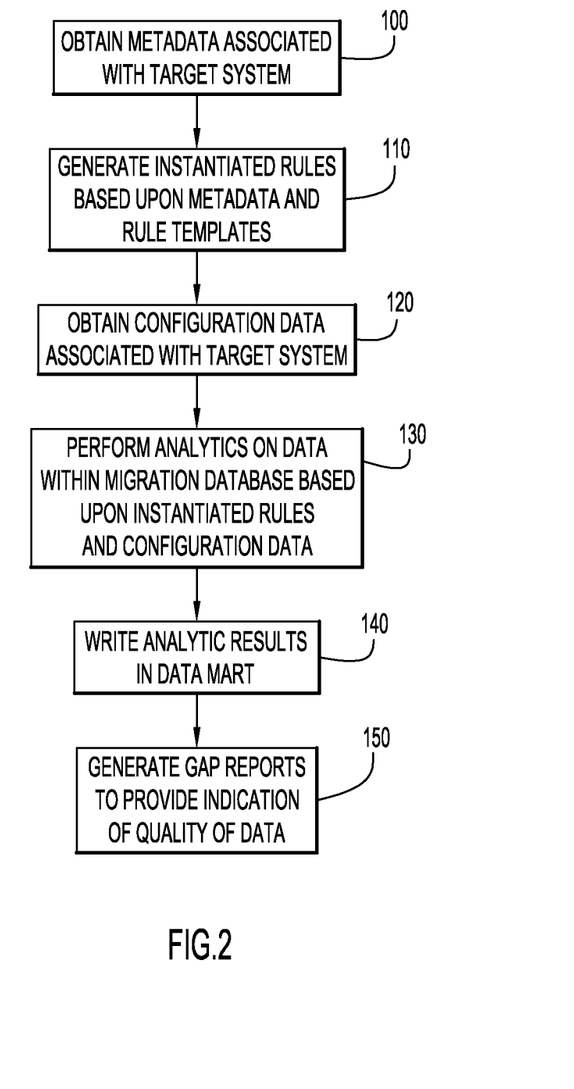
FIG. 2 is a flow diagram illustrating the manner in which data is analyzed to generate and present visualizations that provide information relating to the data quality during migration of data from data sources to a target system according to an embodiment of the present invention.

An example method of migration of data from data sources to a target system utilizing the system depicted in FIG. 1 is now described with reference to the flowchart of FIG. 2. Initially, metadata 12 from the target system 10 is obtained by the analytics generator 30 (step 100). As noted above, the metadata 12 may be obtained directly from the target system 10 (e.g., by accessing a data dictionary, catalogue and/or any internal metadata tables of the target system) or, alternatively, obtained indirectly or from other sources (e.g., from metadata tables stored in the migration database 4 or by profiling data from the target system 10). Examples of information obtained from metadata for the target system include:

For each table:
 a. Table name
 b. Name of corresponding business object
 c. Flag if table is mandatory (optional otherwise)
 d. Flag if table is in scope
 e. Name of parent table in the business object's table hierarchy For each field/column in a table:
 a. Table name
 b. Field name
 c. Domain name (something like a named datatype)
 d. Data type
 e. Field length, scale, precision
 f. Corresponding reference data table
 g. Flag if field is mandatory
 h. Flag if field is in scope
 i. Flag if field is part of the primary key For each foreign key relationship between 2 tables or between a table and a reference data table:
 a. Table name
 b. Reference data table name
 c. For each key field in the reference data table
  i. corresponding field in table that is used in the join condition of the foreign key relationship For each enumeration type:
 a. Domain name
 b. List of valid values After the metadata is obtained, instantiated rules are generated by the analytics generator 30 utilizing the metadata and rule templates from the rule templates module 32 (step 110), and the instantiated rules are stored in the instantiated rules module 34. The instantiated rules include an indication as to which fields and columns in data tables should be checked to verify whether the data complies with the rules. An example of how the analytics generator combines metadata with a template to automatically form an instantiated rule (in the form of an SQL statement) for generating a Data Completeness Gap Report (DCGR) is provided as follows:

```
"SELECT VarChar(LEGACY_ID) AS LEGACY_ID, "': VAL_SCHEMA :"' AS
SCHEMA_NAME, "' : OBJECT_NAME :"' AS OBJECT_NAME, "' :
copies.TABLENAME : "' AS TABLE_NAME, "' : GAP_TYPE : "' AS GAP_TYPE, " : "
VarChar(" : copies.TABLE_KEY : ") AS OBJECT_KEY, VarChar(" :
copies.FIELDNAME : ") as FIELD_VALUE, (select count(*) from ": VAL_SCHEMA :"." :
copies.TABLENAME : ") as RECORD_COUNT,":" "': copies.FIELDNAME:"' AS
FIELD_NAME, VarChar(CATEGORY) AS CATEGORY, '' AS FLAG, 1 AS GAP_COUNT
FROM ": VAL_SCHEMA : "." : copies.TABLENAME : " WHERE LOB = VALUE_LOB
AND RLOUT = VALUE_RLOUT AND (length(trim(" : copies.FIELDNAME :")) = 0 OR
length(trim(" : copies.FIELDNAME :")) IS NULL)"
```

In this DCGR rule template, the following elements represent placeholders for the insertion of corresponding metadata values to be obtained from the target system:

VAL_SCHEMA: Schema name, identifies the copy of the data in the migration database to run the checks on.
OBJECT_NAME: name of the corresponding business object
TABLENAME: name of the table where the checked field is in
GAP_TYPE: name of rules template
TABLE_KEY: primary key of the table
FIELDNAME: name of the field that is checked Assume the metadata values corresponding with the placeholders are as follows:

VAL_SCHEMA: ALG0
OBJECT_NAME: CUSTOMER
TABLENAME: E2KNB1M006
GAP_TYPE: DCGR
TABLE_KEY: SEG_E2KNB1M006_P_KEY
FIELDNAME: AKONT

The output instantiated rule for generating a DCGR report (which combines the metadata with the rule template) is as follows:

```
SELECT VarChar(LEGACY_ID) AS LEGACY_ID, 'ALG0' AS SCHEMA_NAME,
'CUSTOMER' AS OBJECT_NAME, 'E2KNB1M006' AS TABLE_NAME, 'DCGR' AS
GAP_TYPE, VarChar(SEG_E2KNB1M006_P_KEY) AS OBJECT_KEY,
VarChar(AKONT) as FIELD_VALUE, (select count(*) from ALG0.E2KNB1M006) as
RECORD_COUNT, 'AKONT' AS FIELD_NAME, VarChar(CATEGORY) AS
CATEGORY, '' AS FLAG, 1 AS GAP_COUNT FROM ALG0.E2KNB1M006 WHERE
LOB = VALUE_LOB AND RLOUT = VALUE_RLOUT AND (length(trim(AKONT)) = 0
OR length(trim(AKONT)) IS NULL)
```

In this output instantiated rule automatically generated by the analytics generator, AKONT is the field for which a completeness check is determined. The instantiated rule generates an SQL statement for each field in any table referenced by the business object identified by the metadata. The VAL_SCHEMA identifies the copy of data to run checks on in the migration database. In some embodiments, two or more copies of data may be checked using an instantiated rule. For example, checks on fields can be run based upon an alignment schema utilizing a copy of data from various data sources that has been structurally aligned, where running the rule for this copy of data provides a baseline or initial assessment of what needs to be done for the data. Checks can further be run on a copy of data that is considered "load ready" (ready for loading or substantially compliant with data requirements of the target system) in order to verify whether all issues have been resolved or what further issues may need to be resolved.

Each rule template can also include additional logic that determines, based upon the metadata, which fields and tables to instantiate the rule template. For example, for a Data Completeness Gap Report (DCGR), the rule template can include logic to instantiate the rules for each field flagged as mandatory and flagged as in scope, and to further use only fields in tables that are flagged as in scope and that belong with the processed business object. For a Data Validity Gap Report (DVGR), the rule template can include logic to instantiate the rules for each field having a corresponding reference data table and being flagged as in scope, and further to use only fields in tables that are flagged as in scope and that belong with the processed business object. In addition, the details of the foreign key relationship are used between the field in the table and the corresponding reference data table. For a Field Length Gap Report (FLGR), the rule template can use logic to instantiate the rules for each field flagged as in scope, to use only fields in tables that are flagged as in scope and that belong with the processed business object, and to use the field specific field length.

After the instantiated rules have been generated, the rules must be executed by the executor 20 to provide an indication of the quality of data for a particular copy (or two or more copies) of data in the migration database 4. Note that by running it on different copies, where each copy is at a different step of the data cleansing and harmonization process, this allows one to see the impact of the cleansing logic related to fixing data quality issues. The executor first obtains the configuration data associated with the target system (step 120). The configuration data describes which values are valid for specific fields. In some applications, the executor can obtain the configuration data directly from the target system. However, in other applications in which the configuration data is not directly accessible from the target system, the configuration data must be extracted to an accessible location such as the migration database 4. The configuration data typically consists of different reference data tables, and the metadata obtained from the target system can be used to derive the reference data tables that are to be used, including the fields associated with the reference data tables and which fields are key fields in each reference data table. Any suitable software can be utilized to extract the configuration data from the target system.

When the executor 20 has the instantiated rules and configuration data, the executor analyzes the data within the migration database (step 130). Each instantiated rule is run on the data (e.g., based upon the logic defined by the SQL statement for each instantiated rule) and the instantiation results are written into the data mart module 22 of the executor 20 (step 140). The rule templates are preferably designed to generate results that are in a suitable format for writing into the data mart module 22.

An example embodiment is now described in which instantiated rules are applied by the executor 20 using a rules template that generates a Data Validity Gap Report (DVGR). For this rules template, values in the checked field of the data within the migration database are compared with the configuration data in a corresponding reference data table for the target system 10. When utilizing SQL statements to perform the analysis, a join operation can be performed between a table of data from the migration database and the corresponding reference data table for the target system (where each reference data table needed for the analysis has been copied into the migration database) in the following manner:

```
select TRIM(T from CHAR(LEGACY_ID)) AS LEGACY_ID,
  'ALG0' AS SCHEMA_NAME, 'MATERIAL' AS OBJECT_NAME,
  'MAKT' AS TABLE_NAME, 'DVGR' AS GAP_TYPE,
  TRIM(T from CHAR(PK_MAKT)) AS OBJECT_KEY,
  TRIM(T from CHAR(SPRAS)) as FIELD_VALUE,
  (select count(*) from ALG0.MAKT WHERE LOB='LOB_16_I'
AND RLOUT = 'RLOut_16_I') as RECORD_COUNT,
  'SPRAS' AS FIELD_NAME, TRIM(T from CHAR(CATEGORY))
  AS CATEGORY, '' AS FLAG, 1 AS GAP_COUNT
FROM ALG0.MAKT DATATABLE
WHERE NOT EXISTS
  (select 1 from PLD.JLT_T002 CHECKTABLE
    WHERE DATATABLE.SPRAS = CHECKTABLE.SPRAS)
  AND DATATABLE.SPRAS IS NOT NULL AND
  LOB = 'LOB_16_I' AND RLOUT = 'RLOut_16_I' AND
  LENGTH(DATATABLE.SPRAS) > 0
```

In this embodiment, the metadata value for VAL_SCHEMA is ALG0, the metadata value for OBJECT_NAME is MATERIAL, the metadata value for TABLE_NAME is MAKT, the metadata value for GAP_TYPE is DVGR, and the metadata value for FIELD_NAME is SPRAS. The join operation is performed using a NOT EXISTS clause. This allows for a check of a field from the identified data table of the migration database (ALG0) against the corresponding field in the reference data table of the target system while applying a particular rule template (DVGR).

Any number of instantiated rules can be run concurrently, where the results can then be combined utilizing a UNION ALL clause in SQL. This allows for the running of a plurality of instantiated rules for a quality check on the data within the migration database in a single job run. The data generated from running the instantiation rules in combination with the configuration data in a manner such as described above is stored within the data mart 22 of the executor 20 (step 140).

Visualization of the data within the data mart 22 is performed utilizing the Gap Reports module 24 (step 150). The Gap Reports module 24 can include any one or more suitable types of reporting software configured to generate different types of charts or other types of visualizations based upon data within the data mart 22, wherein the visualizations provide a level of compliance or suitability of the data for loading within the target system 10 based upon the requirements of the target system. The data mart 22 can be configured to provide a common format for all rules templates and for all tables and fields that are checked, such that reports can be generated with a common format for different rule templates. The data from the data mart can be displayed to provide information based upon any one or a combination of metadata variables, including schema name, object name, gap type, one or more table names in which fields are checked, etc. The data allows for the identification of patterns of gaps (e.g., based upon analyzing one or more gap types) and can further identify whether certain gaps are systematic errors or solitary exceptions in the data within the migration database.

Figure 3:
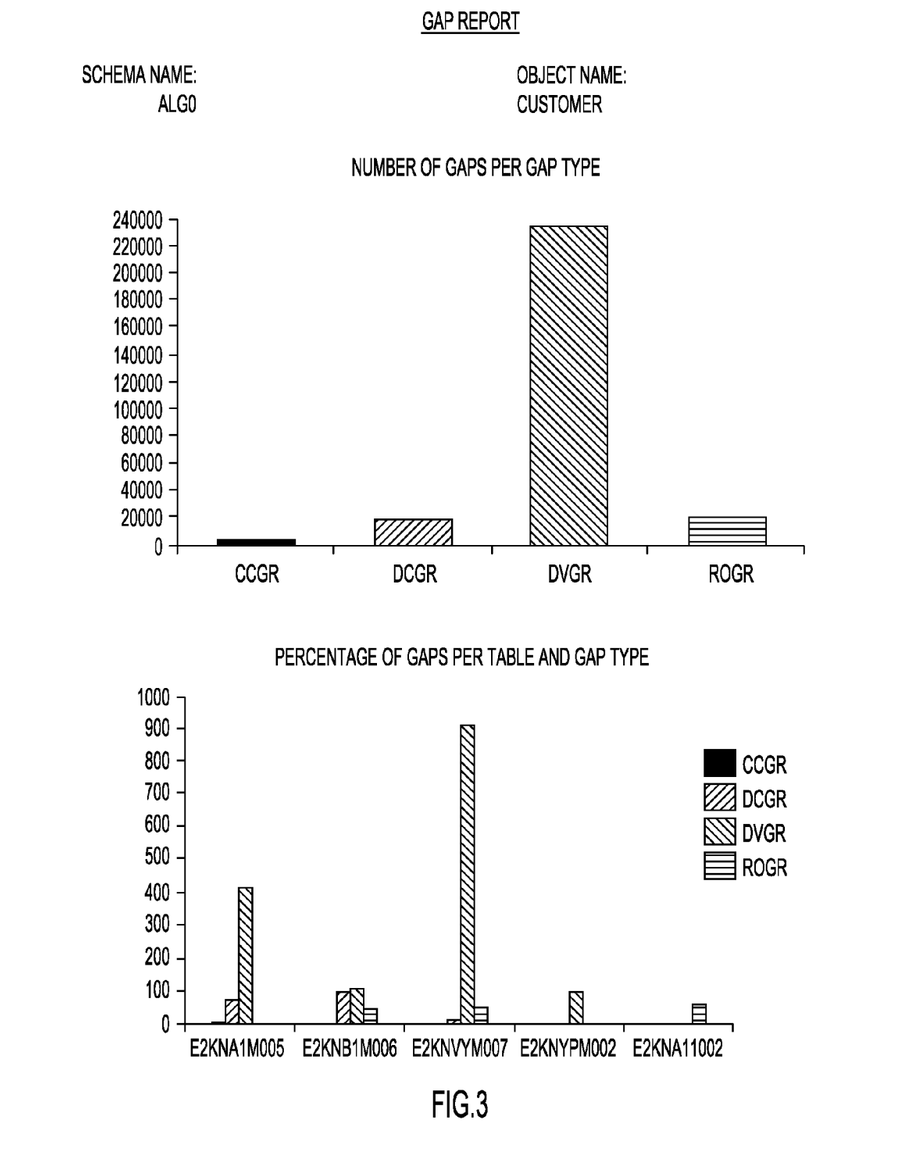
FIG. 3 depicts visualizations providing indications of data quality for data that is migrated from data sources to a target system according to an embodiment of the present invention.

Two examples of visualization data or Gap Reports are depicted in FIG. 3. In one example Gap Report, the number of gaps (e.g., number of fields which violate instantiation rules and/or configuration data for such fields) are plotted per gap type (CCGR, DCGR, DVGR and ROGR) for a particular schema name (ALG0) and object name (CUSTOMER). For comparison purposes, the percentage of gaps are plotted per table name and gap type (i.e., for each table name, the number of gaps are reported for each of the gap types CCGR, DCGR, DVGR and ROGR). This information provides an indication of the readiness or the level of compliance or suitability the data is for loading into the target system, where the different gap types provide different indications of quality or usability of the data within the target system.

Thus, the embodiments of the invention provide an accurate indication of data quality based upon different rule templates, where Gap Reports can be run at different times during a data migration process, so as to identify quality issues and enhance cleaning or correction of data during migration. A particular data migration process can also be tracked with greater precision based upon the execution of Gap Reports at select periods during data migration. The generation of quality data with a common format based upon application of instantiated rules with configuration data allows reports to be provided in a simplified manner for all business objects.

It will be appreciated that the embodiments described above and illustrated in the drawings represent only a few of the many ways of implementing embodiments for automatic generation of instantiation rules to determine the quality of data being migrated from data sources to a target system.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., browser software, communications software, server software, cleansing and data quality analysis software, etc.). These systems may include any types of monitors and input devices (e.g., keyboard, mouse, voice recognition, etc.) to enter and/or view information.

It is to be understood that the software (e.g., the data mart, Gap Report module, rule template module, instantiated rule module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database structures may be implemented by any number of any conventional or other databases, data stores or storage structures (e.g., files, databases, data structures, data or other repositories, etc.) to store information. The databases and/or other storage structures may be remote from or local to the computer or other processing systems, and may store any desired data.

Present invention embodiments may be utilized for analyzing the data of any types (e.g., boolean, character, alphanumeric, symbols, etc.) representing any information. Further, present invention embodiments may be utilized for analyzing data from any types of storage units, systems or devices (e.g., databases, files, memory devices, data structures, processing devices, various types of stationary or mobile computer or processing systems or devices, etc.). The data analyzed from one or more data sets may be of any size, and include any type of data and metadata.

The present invention embodiments may employ any number of any type of user interface (e.g., Graphical User Interface (GUI), command-line, prompt, etc.) for obtaining or providing information (e.g., obtaining information for the desired analysis to be performed, providing charts or other data visualizations, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for analyzing and generating visualizations of data from any data source for any type of process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A computer-implemented method of determining data quality during migration of data from at least one data source to a target system, the method comprising:
    obtaining metadata associated with the target system;
    automatically generating instantiated rules specific to the target system for assessing a quality of data to be loaded from the at least one data source into the target system by applying the obtained metadata to one or more rule templates, wherein the instantiated rules are dependent upon the obtained metadata and vary between different target systems;
    performing a quality analysis by applying the instantiated rules to the data to be loaded into the target system and providing an indication of a level of compliance of the data with requirements of the target system, wherein the performing a quality analysis further comprises:
        discovering, from the metadata, whether each field within each table is supported by a respective reference data table, and
        for each respective reference data table supporting a field, performing:
            generating a respective extraction job to extract the respective reference data table from configuration data,
            validating, against the extracted respective reference data table, each respective field within each respective table supported by the respective reference data table, and
            when a value of a respective field supported by the respective reference data table does not exist in the extracted respective reference data table, identifying a data validity gap; and
    providing a visualization of a level of compliance of the data in relation to requirements of the target system resulting from the performance of the quality analysis on the data utilizing the instantiated rules, wherein the visualization comprises a plurality of gap reports, each gap report providing an indication of one of a plurality of specific gap types of the data in relation to the requirements of the target system so as to identify quality issues and enhance cleaning or correction of the data during the migration.

2. The method of claim 1, wherein the instantiated rules require a check of specific fields and columns in data structures to verify whether the data within the specific fields and columns complies with the instantiated rules.

3. The method of claim 1, wherein the instantiated rules are applied to data within a migration database prior to loading the data into the target system.

4. The method of claim 1, wherein the respective reference data table comprises information about values that are valid for the respective field supported by the respective reference data table.

5. The method of claim 1, wherein each instantiated rule is automatically generated by combining metadata associated with the target system with a pre-defined rule template.

6. The method of claim 1, wherein the plurality of specific gap types comprise at least two of a Data Completeness Gap Report (DCGR), a Data Validity Gap Report (DVGR), a Field Length Gap Report (FLGR), a Category Completeness Gap Report (CCGR), a Relationship Orphan Gap Report (ROGR), a Record Relationship Gap Report (RRGR) and a Data Type Gap Report (DTGR).

7. A system for assessing a quality of data during migration of the data from at least one data source to a target system, wherein after the assessing and possible data cleansing, the data is loaded into the target system, the system comprising:
    at least one processor configured with logic to:
        obtain metadata associated with the target system and automatically generate instantiated rules specific to the target system for assessing a quality of data while in transit to the target system by applying the obtained metadata to one or more rule templates, wherein the instantiated rules are dependent upon the obtained metadata and vary between different target systems;
        perform a quality analysis by applying the instantiated rules to the data while in transit to the target system and provide an indication of a level of compliance of the data with requirements of the target system, wherein the logic to perform a quality analysis further comprises logic for the at least one processor to be configured to:
            discover, from the metadata, whether each field within each table is supported by a respective reference data table, and
            for each respective reference data table supporting a field, perform:

generate a respective extraction job to extract the respective reference data table from configuration data, validate, against the extracted respective reference data table, each respective field within each respective table supported by the respective reference data table, and when a value of a respective field supported by the respective reference data table does not exist in the extracted respective reference data table, identify a data validity gap; and provide a visualization of a level of compliance of the data in relation to requirements of the target system resulting from the performance of the quality analysis on the data utilizing the instantiated rules, wherein the visualization comprises a plurality of gap reports, each gap report providing an indication of one of a plurality of specific gap types of the data in relation to the requirements of the target system so as to identify quality issues and enhance cleaning or correction of the data during the migration.

8. The system of claim 7, wherein the at least one processor is further configured to utilize the instantiated rules so as to require a check of specific fields and columns in data tables to verify whether the data within the specific fields and columns complies with the instantiated rules.

9. The system of claim 7, wherein the respective reference data table comprises information about values that are valid for the respective field supported by the respective reference data table.

10. The system of claim 7, wherein each instantiated rule is automatically generated by combining metadata associated with the target system with a pre-defined rule template.

11. The system of claim 7, wherein the plurality of specific gap types comprise at least two of a Data Completeness Gap Report (DCGR), a Data Validity Gap Report (DVGR), a Field Length Gap Report (FLGR), a Category Completeness Gap Report (CCGR), a Relationship Orphan Gap Report (ROGR), a Record Relationship Gap Report (RRGR) and a Data Type Gap Report (DTGR).

12. A computer program product for determining data quality during migration of data from at least one data source to a target system, the computer program product comprising:

a computer readable storage medium having computer readable program code embodied therewith, the computer readable program code configured to:

obtain metadata associated with the target system;

automatically generate instantiated rules specific to the target system for assessing a quality of data to be loaded from the at least one data source into the target system by applying the obtained metadata to one or more rule templates, wherein the instantiated rules are dependent upon the obtained metadata and vary between different target systems;

perform a quality analysis by applying the instantiated rules to the data to be loaded into the target system and provide an indication of a level of compliance of the data with requirements of the target system, wherein the computer readable program code being configured to perform a quality analysis further comprises the computer readable program code being configured to:

discover, from the metadata, whether each field within each table is supported by a respective reference data table, and for each respective reference data table supporting a field, perform:

generate a respective extraction job to extract the respective reference data table from configuration data, validate, against the extracted respective reference data table, each respective field within each respective table supported by the respective reference data table, and when a value of a respective field supported by the respective reference data table does not exist in the extracted respective reference data table, identify a data validity gap; and provide a visualization of a level of compliance of the data in relation to requirements of the target system resulting from the performance of the quality analysis on the data utilizing the instantiated rules, wherein the visualization comprises a plurality of gap reports, each gap report providing an indication of one of a plurality of specific gap types of the data in relation to the requirements of the target system so as to identify quality issues and enhance cleaning or correction of the data during the migration.

13. The computer program product of claim 12, wherein the instantiated rules require a check of specific fields and columns in data tables to verify whether the data within the specific fields and columns complies with the instantiated rules.

14. The computer program product of claim 12, wherein the instantiated rules are applied to data within a migration database by the computer readable program code prior to loading the data within the target system.

15. The computer program product of claim 12, wherein the respective reference data table comprises information about values that are valid for the respective field supported by the respective reference data table.

16. The computer program product of claim 12, wherein each instantiated rule is automatically generated by the computer readable program code by combining metadata associated with the target system with a pre-defined rule template.

17. The computer program product of claim 12, wherein the plurality of specific gap types comprise at least two of a Data Completeness Gap Report (DCGR), a Data Validity Gap Report (DVGR), a Field Length Gap Report (FLGR), a Category Completeness Gap Report (CCGR), a Relationship Orphan Gap Report (ROGR), a Record Relationship Gap Report (RRGR) and a Data Type Gap Report (DTGR).

* * * * *